United States Patent [19]
Monette et al.

[11] Patent Number: 6,019,011
[45] Date of Patent: Feb. 1, 2000

[54] SYSTEM FOR CONTROL OF AUXILIARY SECTION OF COMPOUND TRANSMISSIONS

[75] Inventors: Daniel A. Monette, Battle Creek; John A. Modreske, Mattawan, both of Mich.

[73] Assignee: Eaton Corporation, Cleveland, Ohio

[21] Appl. No.: 09/208,122

[22] Filed: Dec. 9, 1998

[51] Int. Cl.[7] .................................................. F16H 59/00
[52] U.S. Cl. ........................................ 74/346; 137/625.69
[58] Field of Search ................ 74/335, 346; 137/625.66, 137/625.68, 625.69

[56] References Cited

U.S. PATENT DOCUMENTS

| | | | |
|---|---|---|---|
| 4,083,382 | 4/1978 | Khatti et al. | 137/625.69 X |
| 4,722,237 | 2/1988 | Mcninch, Jr. | 74/346 |
| 4,754,665 | 7/1988 | Vandervoort . | |
| 5,186,066 | 2/1993 | Pankratz et al. | 137/625.69 X |
| 5,193,410 | 3/1993 | Stine et al. . | |
| 5,199,311 | 4/1993 | Muyskens et al. . | |
| 5,199,312 | 4/1993 | Huggins et al. . | |
| 5,207,113 | 5/1993 | Desaultels et al. | 137/625.66 X |
| 5,216,931 | 6/1993 | Hirsch et al. . | |
| 5,218,878 | 6/1993 | Monette et al. . | |
| 5,222,404 | 6/1993 | Stine . | |
| 5,224,392 | 7/1993 | Hutchison et al. . | |
| 5,231,895 | 8/1993 | Stine . | |

*Primary Examiner*—Khoi Q. Ta
*Attorney, Agent, or Firm*—Brooks & Kushman P.C.

[57] ABSTRACT

A control system for auxiliary section range and/or splitter control includes a direct ported control valve assembly having a spool disposed within a bore of a cover housing, the spool having a differential area to bias the valve and two sealing members radially biased by a spring to direct pressurized air or hydraulic fluid to an appropriate side of a piston to effect the splitter and/or range shift of the transmission. The control valve assembly includes components, such as the valve spool, which may be used in various transmission applications in addition to components, such as the pilot cap and seal plate, which may be selected to control the logic (normally open or normally closed) of the valve assembly and the apply rate of the range and/or splitter cylinder depending upon the particular application. A filter/regulator is mounted to the valve cover assembly to provide direct porting of the pressurized fluid supply to eliminate connecting hoses.

19 Claims, 7 Drawing Sheets

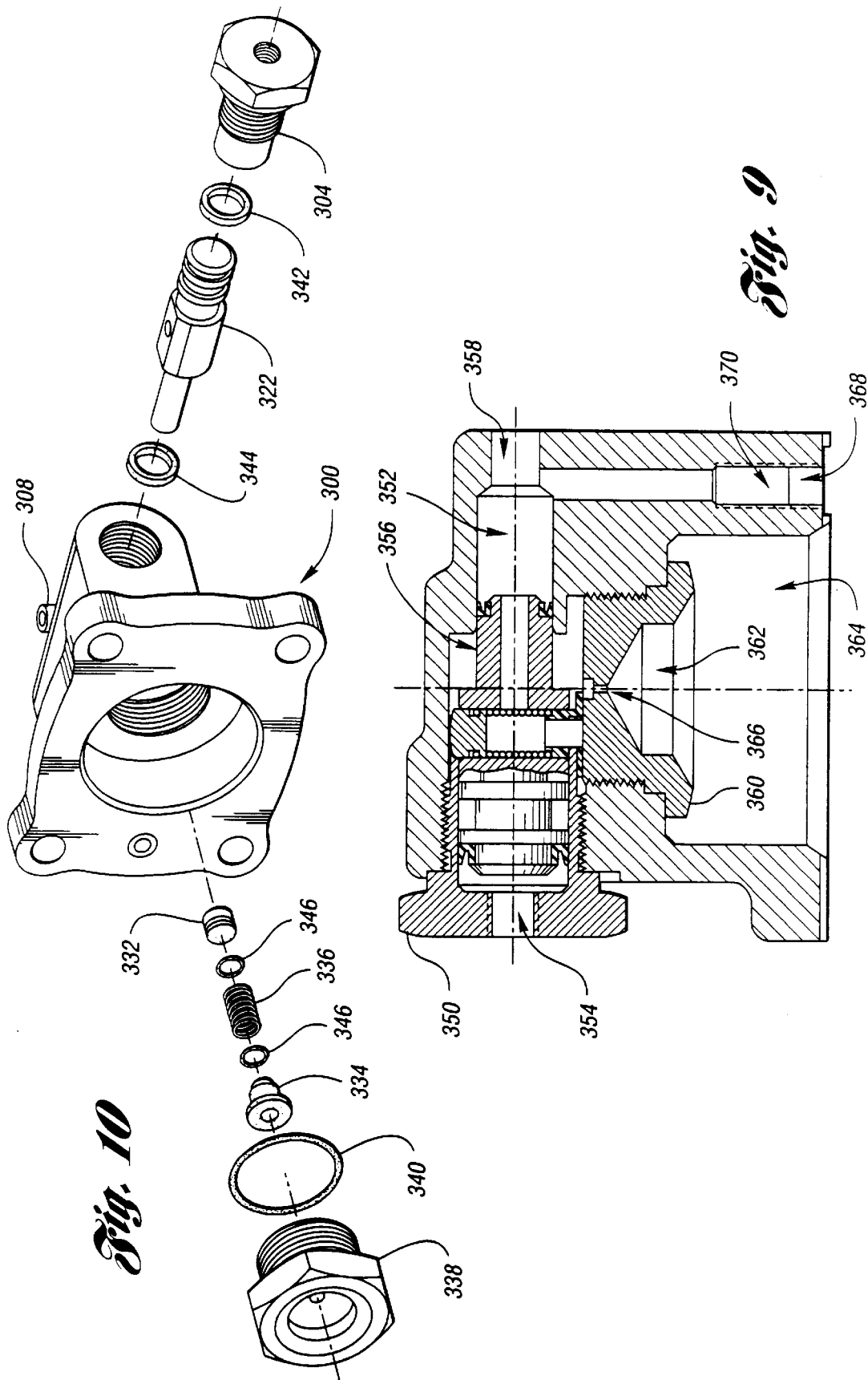

SYSTEM FOR CONTROL OF AUXILIARY SECTION OF COMPOUND TRANSMISSIONS

TECHNICAL FIELD

The present invention relates to a system for controlling the range and/or splitter shifts of an automated or semi-automated mechanical transmission.

BACKGROUND ART

Compound change gear transmissions of the type having one or more auxiliary sections connected in series with a main transmission section are very well known in the prior art. Such transmissions are typically associated with heavy duty vehicles such as large trucks, tractor semi-trailers, and the like. By utilizing main and auxiliary transmission sections connected in series, the total number of available transmission ratios is generally equal to the product of the main and auxiliary section ratios. For example, a compound change gear transmission comprising a four (4) speed main section connected in series with a three (3) speed auxiliary section will provide twelve (4×3=12) available ratios.

Auxiliary transmission sections may generally be characterized as range type, splitter type, or combined range and splitter type. In compound transmissions having a range type auxiliary section, the range section ratio step or steps are greater than the total ratio coverage of the main transmission section and the main section is shifted progressively through its ratios in each range. The assignee's well known RT/RTO Roadranger transmissions include a "(5)×(2)" ten speed heavy duty range type transmission. In compound transmissions having a splitter type auxiliary section, the ratio steps of the splitter auxiliary section are less than the ratio steps of the main transmission section and each main section ratio is split, or subdivided, by the splitter section. In a combined range and splitter type auxiliary section, or sections, both range and splitter type ratios are provided allowing the main section to be progressively shifted through its ratios in at least two ranges and also allowing the main section ratios to be split in at least one range. Assignee's well known RT/RTO 11613 and RT/RTO 14718 "Eaton Roadranger" transmissions are examples of a "(4+1)×(3)" thirteen-speed and a "(4+1)×(4)" eighteen-speed combined range/splitter type transmission.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

In compound transmissions of the range or the combined range/splitter or splitter/range types, the main transmission section is typically shifted using a shift bar housing assembly, or a single shift shaft assembly, controlled by a manually operated shift lever. The auxiliary range section is generally shifted using a button or a switch which controls a remote slave valve/actuator mechanism. In so-called "double H" or "one and one-half H" type controls, the range is shifted in response to switches which sense the position of the shift lever. The actuator mechanism typically includes a cylinder cover/valve assembly which directs pressurized fluid (air) to one side of the appropriate cylinder/piston while exhausting the opposite side. The pressurized fluid is supplied through a hose from a filter/regulator which reduces and regulates the fluid pressure while also filtering particulates. Prior actuator mechanisms employed a cast iron cylinder with a cast iron cylinder cover and a brass poppet valve inside the cover. This sometimes led to sticking of the valve resulting from galvanic corrosion of the spool and/or cylinder cover. Because the poppet valve travel was limited to reduce the time required to change states from open to closed, these valves were also vulnerable to sticking caused by contamination or particulates in the pressurized fluid.

DISCLOSURE OF INVENTION

An object of the present invention is to provide a control system for an auxiliary section range and/or splitter shift which reduces or eliminates valve sticking caused by corrosion.

Another object of the present invention is to provide a control system for an auxiliary section range and/or splitter shift which utilizes a direct ported supply to eliminate connection hoses between the filter/regulator and the actuating cylinder.

A further object of the present invention is to provide a cylinder cover assembly having a housing and spool valve made of similar or compatible materials to reduce or eliminate any metallurgical incompatibilities which may result in valve sticking.

Another object of the present invention is to provide a cylinder cover assembly which utilizes interchangeable components for the splitter and range cylinder cover assemblies.

An additional object of the present invention is to provide a control system for an auxiliary section range and/or splitter shift which replaces two three-way valves with one four-way valve.

Another object of the present invention is to provide a cylinder cover valve assembly which may be retrofitted to currently installed cylinders.

In carrying out the above objects and other objects, features, and advantages of the present invention, a control system for controlling shifting of an auxiliary section of a compound mechanical transmission includes a cylinder cover adapted for engagement with the range or splitter cylinder, the cylinder cover having a seal plate bore and a valve bore, the valve bore oriented generally transverse to the seal plate bore, and a spool valve disposed within the valve bore and axially translatable between a first position connecting a supply of pressurized fluid to a first side of the piston to translate the piston in a first direction within the cylinder to engage a first one of a plurality of gears, and a second position connecting the supply of pressurized fluid to a second side of the piston to translate the piston to a second direction within the cylinder to engage a second one of the plurality of gears. The spool valve has first, second, and third diameters with the first diameter being smaller than the second and third diameters to bias the spool valve toward the first direction when substantially equal pressure is applied to the first and third diameters. The first diameter portion of the spool valve has an axial bore extending therethrough and intersecting a transverse bore extending through the second diameter and exiting the spool valve in a flatted region. The assembly also includes a first sealing member or slipper seal having an annular portion extending within the transverse bore of the second diameter of the spool valve with a flange contacting the flatted portion. A second sealing member, or balance seal, is diametrically opposed the first sealing member and partially disposed within the transverse bore and extending radially outward to contact the valve bore. A spring disposed between the first and second sealing members urges the first and second sealing members radially outward to center the spool valve within the valve bore.

A number of advantages are associated with the present invention. For example, the present invention reduces the likelihood of control valves sticking due to contaminants or corrosion within the cylinder cover assembly. The present invention reduces the total number of different parts required by using a common spool for range and splitter cylinder cover assemblies. The diametrically opposed slipper seal and balance seal used in conjunction with u-shaped cup seals provides a self-wiping design less susceptible to sticking due to contaminants. The direct porting design of the present invention eliminates connecting hoses between the filter/regulator and the cylinder assemblies which reduces overall cost and improves reliability by reducing the number of connections.

The above advantages in addition to other advantages, features, and objects of the present invention will be readily apparent to one of ordinary skill in the art from the following detailed description of the invention when read in conjunction with the accompanying drawings.

BRIEF DESCRIPTION OF DRAWINGS

FIG. 9 is a cross-section view of an alternative embodiment of a splitter cylinder cover assembly having a normally-closed configuration according to the present invention; and FIG. 10 is a three-dimensional assembly drawing for a splitter cylinder cover assembly according to the present invention.

BEST MODE FOR CARRYING OUT THE INVENTION

Figure 1:
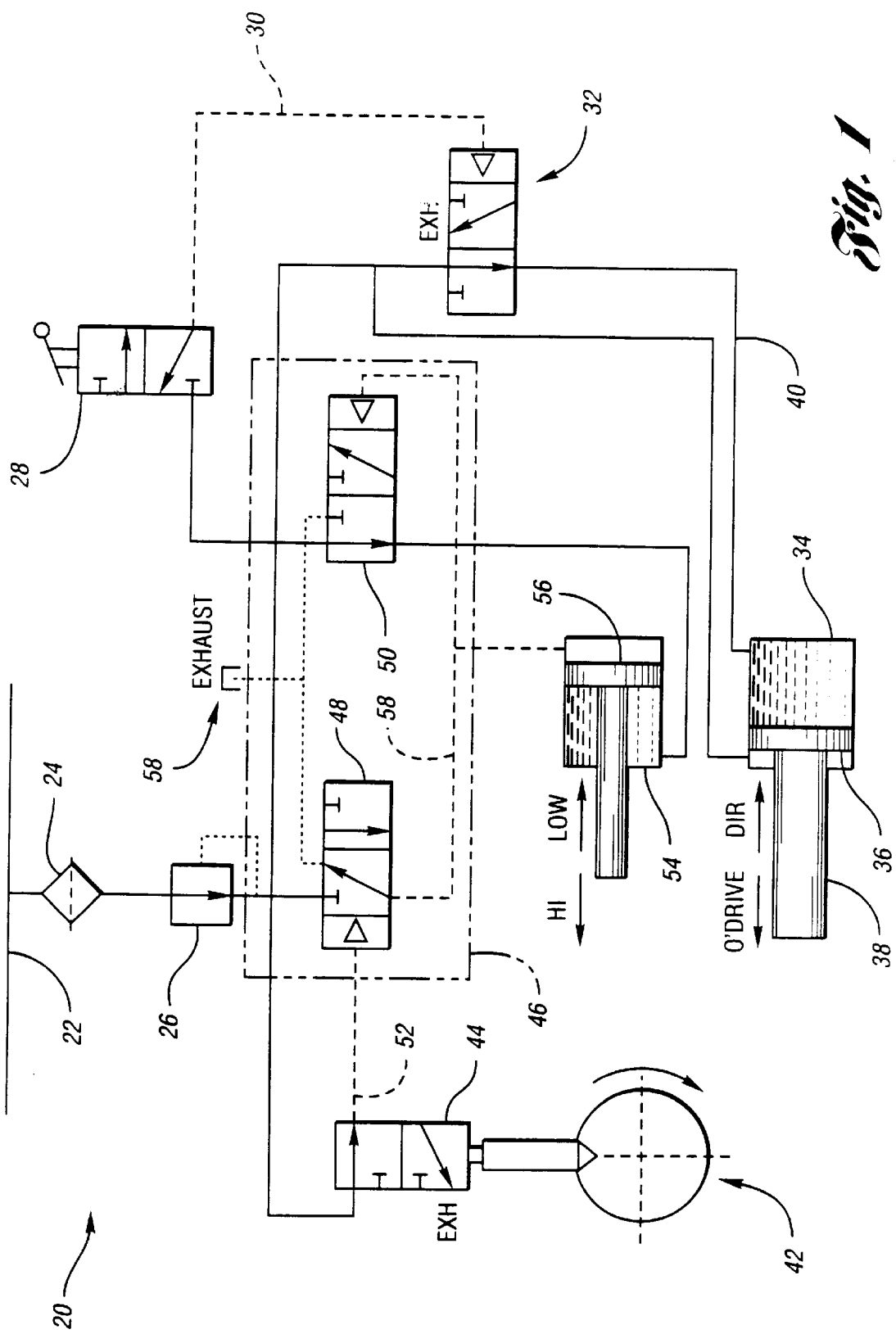
FIG. 1 is an air system schematic of a prior art control system for the auxiliary section of a compound mechanical transmission.

Certain terminology will be used in the following description for convenience in reference only and will not be limiting. The words "upwardly", "downwardly", "rightwardly", and "leftwardly" will designate directions in the drawings to which reference is made. The words "forward" and "rearward" refer respectively to the front and rear ends of the transmission as conventionally mounted in a vehicle. The words "inwardly" and "outwardly" will refer to directions toward and away from, respectively, the geometric center of the device and designated parts thereof. This convention or terminology applies to the words specifically mentioned above in addition to their derivatives and words of similar import.

The term "compound transmission" is used to designate a change speed or change gear transmission having a main transmission section with multiple forward speeds and an auxiliary transmission section connected in series with the main transmission section where the selected gear ratio in the main transmission section may be compounded by a selected gear reduction in the auxiliary transmission section. The terms high-range and high-split refer to a lower ratio of transmission input speed to output speed relative to the terms low-range and low-split.

Referring now to FIG. 1, an air system schematic for a prior art 10-speed transmission is shown. Control system 20 represents a typical pneumatic or hydraulic control system which uses a pressurized fluid to control shifting of an auxiliary section range or splitter in a compound mechanical transmission. The pressurized fluid, preferably air, is delivered via a supply line 22 through a filter 24 at approximately 110 psi. A filter/regulator 26 reduces the pressure to approximately 60 psi while also providing a secondary filter to remove particulates or contaminants. As well known in the art, for pneumatic systems, a light lubricant or oil is introduced into the air system to lubricate the various components while also resisting corrosion.

Regulated and filtered air is supplied to a master valve assembly, preferably located on the shift knob or shift lever. The vehicle operator manipulates the master valve via a switch or knob to control the splitter shift by selectively supplying or removing a pressurized fluid control signal via pilot line 30 connected to splitter valve 32. When master valve 28 is in the position illustrated in FIG. 1, pressurized air from filter regulator 26 is blocked by master valve 28 such that splitter valve 32 is in the high-split or overdrive split position. This directs the supply air to both sides of splitter cylinder 34. A differential area piston 36 has a larger surface area on the rightward or direct-drive side relative to the leftward or overdrive side causing piston 36 and rod or shaft 38 to move in the direction illustrated.

When the operator manipulates the master valve via the shift knob or lever to the low-split or direct-split position, the supply air is directed through pilot line 30 which shifts splitter valve 32 such that line 40 is connected to the exhaust allowing splitter piston 36 to travel toward the right.

For the implementation illustrated in FIG. 1, the range shift is performed based on the position of the shift lever rather than the position of a range button or knob. As such, the range shift is commanded automatically based on the relative lateral position of the shift lever in selecting low-range or high-range gear ratios. As such, this configuration is referred to as an autorange configuration which uses an actuating cam system, represented generally by reference numeral 42, to control a range valve 44 coupled thereto. In the position shown, pressurized air is directed from filter/regulator 26 through range valve 44 to the range cylinder cover assembly 46 which includes first and second two-way, two-position valves 48 and 50. Pressurized air travels from range valve 44 through pilot 52 to first valve 48 causing valve 48 to move to the right which connects the right side of range cylinder 54 and piston 56 to exhaust 58. Pressurized supply air travels from filter/regulator 26 through second valve 50 to fill the left side of range cylinder 54 causing range piston 56 to move toward the right or low-range position.

When the operator moves the shift lever laterally, cam 42 rotates causing range valve 44 to shift so that pressurized air in pilot 52 is exhausted. This causes range valve 48 to shift to the left connecting pressurized air through line 58 to range cylinder 54, while second valve 50 also moves to the left connecting the left side of range cylinder 54 and piston 56 to exhaust. As such, range piston 56 travels toward the left or high-range position.

Figure 2:
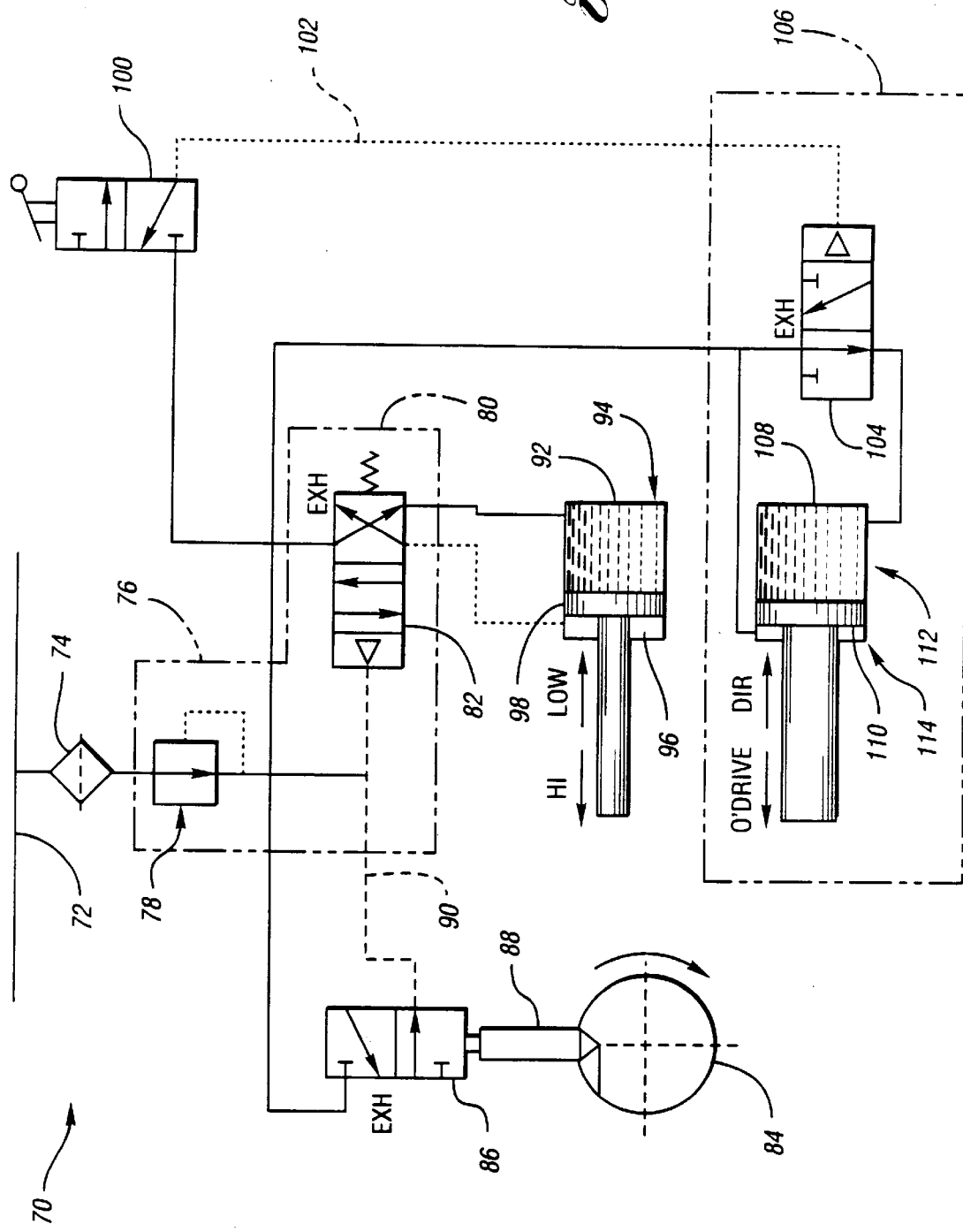
FIG. 2 is an air system schematic for a control system of a 10-speed compound mechanical transmission according to the present invention.

Referring now to FIG. 2, an air supply schematic for a control system utilized in a 10-speed compound mechanical transmission according to the present invention is shown. Control system 70 receives pressurized fluid, preferably air, via supply line 72. The supply air is filtered by filter 74 and supplied to the range cylinder cover assembly 76 which includes a filter/regulator 78 mounted to the range cylinder cover body or housing 80 such that supply air is directly ported to the range cylinder cover housing 80 to eliminate hoses connecting filter/regulator 78. Control system 70 replaces first and second two-position, three-way valves with a single four-way, two-position valve 82. The range cylinder cover assembly 76 may preferably be retrofitted to existing range cylinders.

In operation, when the operator laterally moves the shift lever, cam 86 rotates and operates range valve 86 via an appropriate linkage 88. In the position shown in FIG. 2, supply air from filter/regulator 78 is blocked or dead-headed by range valve 86, and pilot 90 is exhausted. This causes the four-way, two-position valve 82 to move toward the left such that supply air is connected to the right side 92 of range cylinder 94 while the left side 96 of range cylinder 94 and piston 98 is connected to exhaust. This causes range piston 98 to move toward the left or high-range position.

Appropriate positioning of the shift lever by the operator rotates cam 84 such that linkage 88 rides on the outer diameter of cam 84 shifting range valve 86. This allows supply air to travel through pilot 90 to valve 82 within range cylinder cover assembly housing 80. A differential area valve spool causes valve 82 to shift toward the right such that supply air is connected to left side 96 of range cylinder 94 and piston 98, while right side 92 is exhausted. This causes piston 98 to move toward the right or low-range position which effects the range shift.

The splitter shift is completed in a similar manner, although it is initiated by the operator via a shift knob or button connected to master valve 100. In the position shown, master valve 100 blocks supply air and exhausts pilot 102 such that splitter valve 104 within splitter cylinder cover assembly 106 is shifted toward the right. This directs the pressurized supply air to both sides of splitter cylinder 108 which includes a differential area piston 110 having a larger surface area on right side 112 relative to left side 114. This causes piston 110 to move to the left or the overdrive, high-split position.

When the operator moves the splitter switch, master valve 100 is shifted downward connecting the pressurized supply air to pilot 102 causing splitter valve 104 to move to the left. This connects the right side 112 of splitter cylinder 108 and piston 110 to exhaust causing piston 110 to move to the right or direct drive, low-split position.

Figure 3:
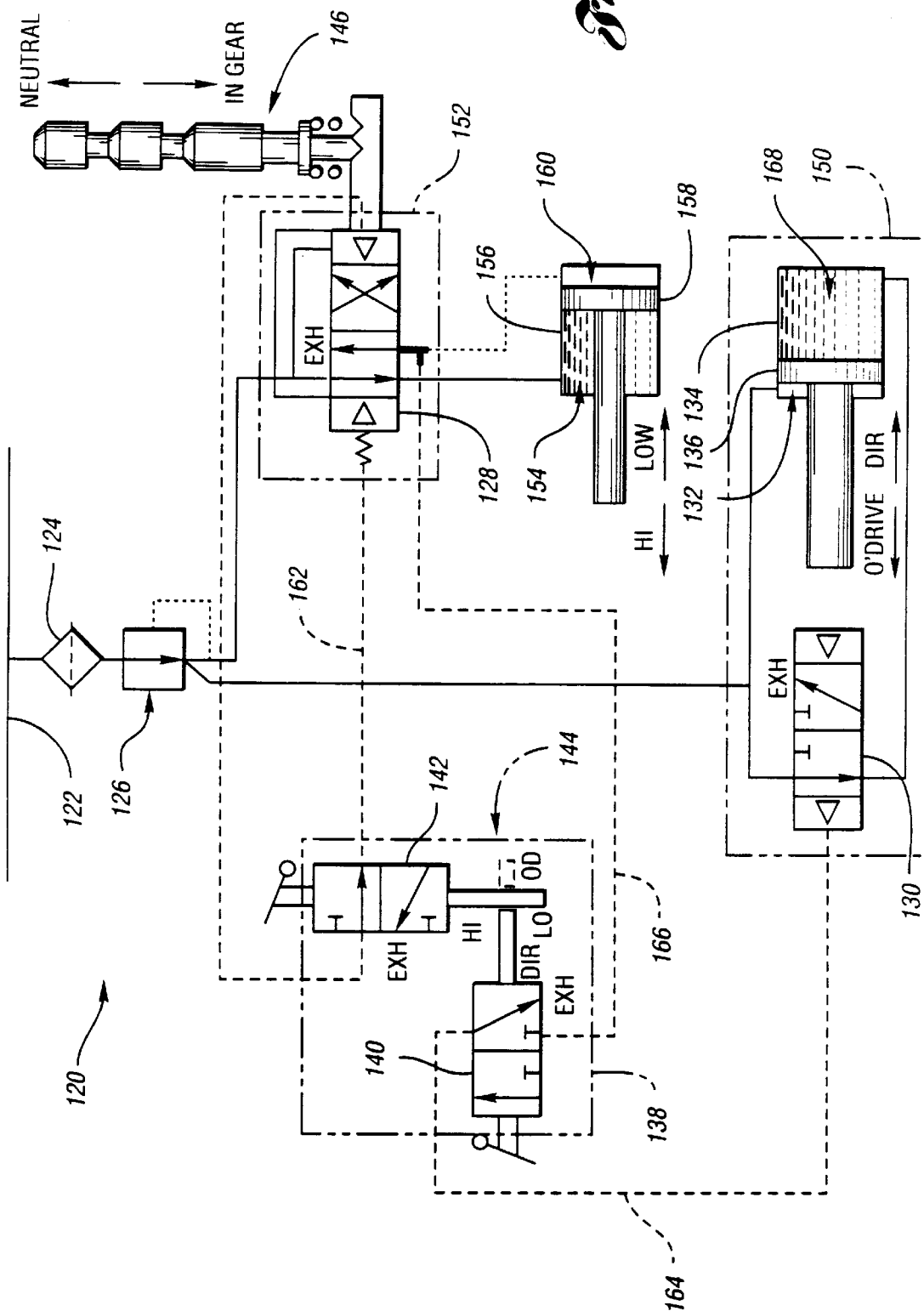
FIG. 3 is an air system schematic for a control system of a 15-speed transmission according to the present invention.

Referring now to FIG. 3, an air system schematic for a second embodiment of a control system for an auxiliary section of a compound mechanical transmission according to the present invention is shown. Control system 120 is preferably utilized on a 13-speed transmission. The vehicle air supply delivers pressurized air via line 122 between filter 124 and filter/regulator 126. The filtered and regulated air is provided to a four-way, two-position range valve 128, a two-way, two-position splitter valve 130 and the left side 132 of splitter cylinder 134 and piston 136. A shift knob master valve 138 includes a master splitter valve 140 and a master range valve 142. Valves 140 and 142 are interlocked via an appropriate mechanism, represented generally by reference numeral 144. Valves 140 and 142 are manually operated by the vehicle operator to selectively perform a range and/or splitter shift. Interlock mechanism 144 allows a splitter shift to be performed only when valve 142 is in the high range.

A range interlock mechanism, indicated generally by reference numeral 146, prevents range valve 128 from being shifted when the main transmission section is in gear, i.e. a range shift may only be performed when the main transmission section is in neutral. However, the vehicle operator may pre-select a range shift while the main transmission section is engaged. An appropriate interlock mechanism does not actually initiate the range shift until the operator shifts the main transmission section to neutral, as explained in greater detail below.

In operation, when the master splitter valve 140 and master range valve 142 are in the positions illustrated in FIG. 3, the low range, overdrive split is selected. Supply air from filter/regulator 126 travels through splitter valve 130, located within the splitter cylinder cover 150, such that substantial equal pressure is applied to both sides of splitter piston 136. The differential area of the right side of piston 136 relative to the left side causes the piston to move toward the left or overdrive position. Supply air also travels from filter/regulator 126 to range valve 128 within range cylinder cover 152 and is directed to the left side 154 of range cylinder 156 and piston 158. The right side 160 of range cylinder 156 and piston 158 is exhausted through range valve 152. This causes range piston 158 to travel to the right or low-range position.

When the vehicle operator selects high range via master valve 144, master range valve 142 is shifted to the upper position which connects pilot 162 to exhaust. When the operator moves the shift lever so that the main section is in neutral, the interlock mechanism 146 allows range valve 128 to shift toward the left such that the left side 154 of range cylinder 156 of piston 158 is exhausted and pressurized fluid from filter/regulator 126 is supplied to the right side 160 of range cylinder 156 and piston 158. This causes range piston 158 to travel toward the left or high-range position.

When in high range, interlock mechanism 144 allows movement of splitter valve 140 to perform a splitter shift between the direct or low-split position and the overdrive or high-split position. The vehicle operator actuates the master splitter valve 140 within the shift knob master valve 138 moving it rightward to connect pilot line 164 to pilot line 166 which is exhausted through range valve 128. This allows splitter valve 130 within splitter cylinder cover 150 to move leftward connecting the right side 168 of splitter cylinder 134 and piston 136 to exhaust. This allows piston 136 to move to the right or direct drive (low-split) position.

The present invention may also be used in a control system to control an 18-speed transmission. However, in the 18-speed application, splitter shifts may be performed in both the low and high ranges. As such, an interlock mechanism such as mechanism 144 is not required. This provides the additional five gear ratios or speeds.

Figure 4:
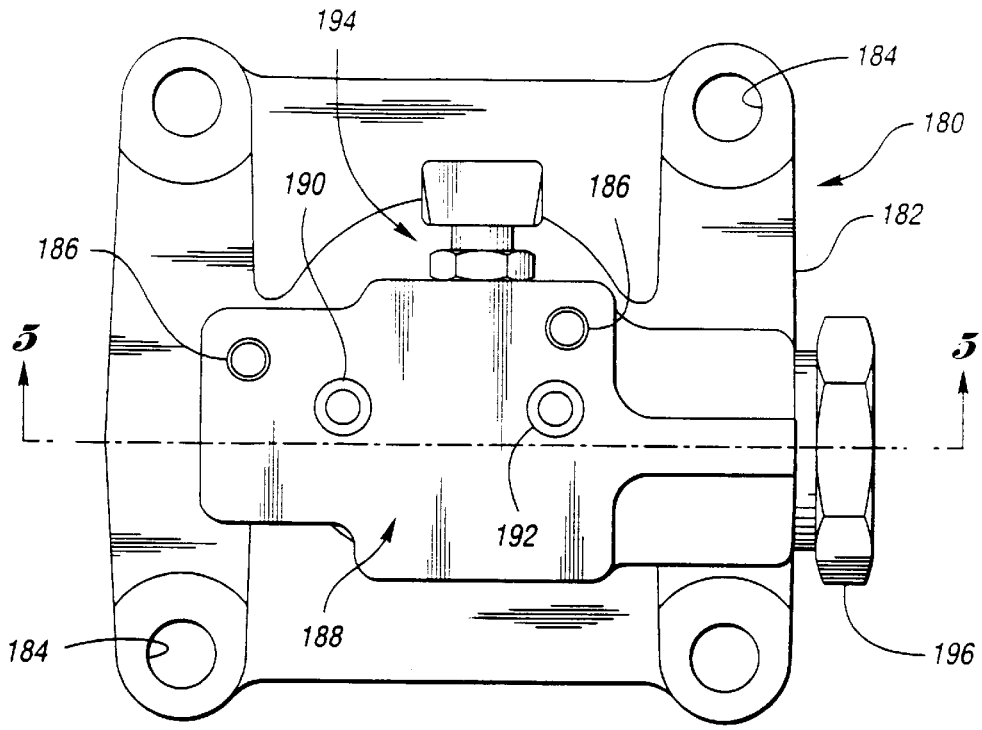
FIG. 4 is a plan view of a range cylinder cover assembly according to the present invention.

Referring now to FIG. 4, a top or plan view of a range cylinder cover assembly according to the present invention is shown. Range cylinder cover assembly 180 includes a housing or valve body 182 preferably made of anodized aluminum. Housing 182 includes four holes 184 for mounting to the range cylinder. Appropriate mounting holes 186 are provided to secure a filter/regulator (not shown) directly to a flat surface 188 of housing 182. The filter/regulator supplies pressurized fluid through supply bore 190 which is preferably counterbored to receive an O-ring. Counterbore 192 is dead-headed and supplied only for compatibility with standard filter/regulators. A breather 194 is used to connect the valve bore (best illustrated in FIG. 5) to exhaust. A pilot cap 196 is preferably threaded into the valve bore and includes a bore to receive a standard pipe fitting for connection of the pilot air hose.

Figure 5:
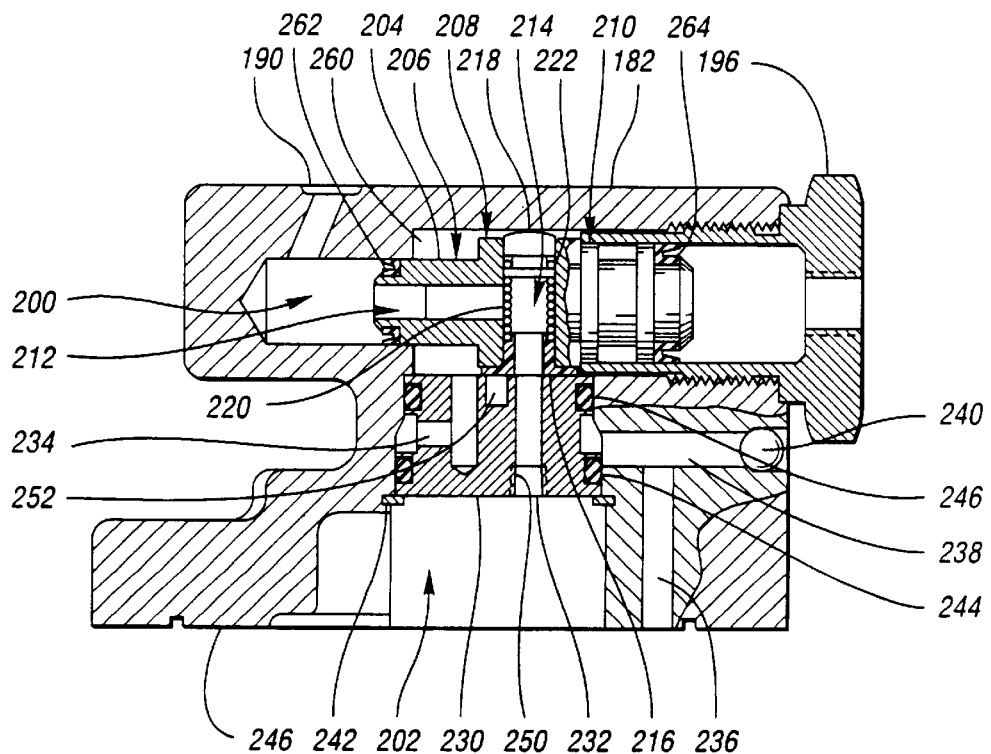
FIG. 5 is a cross-section taken along line 5—5 of FIG. 4.

Referring now to FIG. 5, a cross-section taken along line 5—5 of FIG. 4 of a range cylinder cover assembly according to the present invention is shown. Housing 182 includes a valve bore 200 which is oriented generally transverse to a seal plate bore 202. Although referred to as a seal plate bore 202, housing 182 serves as a positive stop for the range piston (not shown). A spool valve 204 is disposed within valve bore 200 and is axially translatable between the first position connecting supply bore 190 to a first side of the piston (not shown) to translate the piston in a first direction within the cylinder (not shown), and a second position connecting air from supply bore 190 to a second side of the piston. The spool valve 204 includes a first 206, second 208, and third 210 diameter. First diameter 206 is smaller than second diameter 208 and third diameter 210 to bias spool valve 204 toward the first direction (left) when equal pressure is applied to the first 206 and third 210 diameters. First diameter 206 has an axial bore 212 extending through the first diameter 206 and partially into the second diameter 208 and intersecting a transverse bore 214 extending through a flatted region of second diameter 208. A first sealing member 216 (also referred to as the slipper seal) has an annular portion extending within transverse bore 214 with a flange. A second sealing member 218 (also referred to as the balance seal) is positioned diametrically opposite the first sealing member 216 partially disposed within transverse bore 214 and extending radially outward to contact valve bore 200. A spring 220 is disposed between the sealing members 216, 218 to urge the sealing members radially outward and center the spool 204 within valve bore 200. An O-ring 222 is provided between the first sealing member 216 and spring 220 and also on the second sealing member 218.

A seal plate 230 is disposed between seal plate bore 202 and valve bore 200. Seal plate 230 includes a first channel 232 for selectively fluidly coupling valve bore 200 to the first side of the piston (not shown) and a second channel 234, in communication with channel 238 and supply channel 236, for selectively fluidly coupling valve bore 200 to the second side of the piston (not shown). Bore 238 is provided for manufacturability and is sealed by a ball 240 held by a press or interference fit. Seal plate 230 is held within seal plate bore 202 by a snap ring 242 and includes O-rings 244, 246 such that air leakage for both positions of spool valve 204 preferably does not exceed five SCCM from 0–60 psig over the operating temperature range. Likewise, O-ring grooves are provided on the face 246 of housing 182 to seal seal plate bore 202 and supply channel 236.

In one embodiment, seal plate 230 includes a first channel 232 having a threaded portion 250 for ease of disassembly. Preferably, a dowel 252 cooperates with a corresponding slot or groove and seal plate 230 so that the first and second channels are properly aligned with the first sealing member 216. Dowel 252 prevents seal plate 230 from rotating within seal plate bore 202.

In operation, pressurized fluid is supplied via supply bore 190 and acts on first 206 and second 208 diameters of spool 204 to provide a force which urges spool 204 rightward. In the position shown, pilot air supplied through pilot cap 196 is exhausted which allows spool 204 to travel to the right until the flange of slipper seal 216 contacts pilot cap 196. As such, pilot cap 196 provides a positive stop which limits axial travel of spool 204 in one direction. The second diameter 208 cooperates with valve bore 200 to provide a positive stop in the opposite direction.

Pressurized supply air travels through bore 212 of spool 204 and through the annular slipper seal 216 into first channel 232 and seal plate bore 202. Air from the opposite side of the piston (not shown) travels through supply channel 236, second channel 234, and into region 260 which is exhausted through breather 194 (FIG. 4).

To shift the range cylinder, pressurized pilot air is provided through pilot cap 196. The pressurized air acts on the third diameter 210 of spool 204. Because the third diameter has a greater area relative to the first and second diameters, spool valve 204 is urged to the left by substantially equal pressure on both sides. In this position, pressurized supply air travels through supply bore 190, into valve bore 200, through bore 212 of spool 204, through slipper seal 216 and into second channel 234 which is connected to channels 236 and 238 to supply pressurized air to the opposite side of the piston (not shown). In this position, the proximate side of the piston is connected through first channel 232 to exhaust breather 194 (FIG. 4). The various regions of valve bore 200 which include a supply region, an exhaust region, and a pilot region, are isolated or separated by the various sealing members which preferably include self-wiping, U-shaped cup seals 262 and 264.

Figure 6:
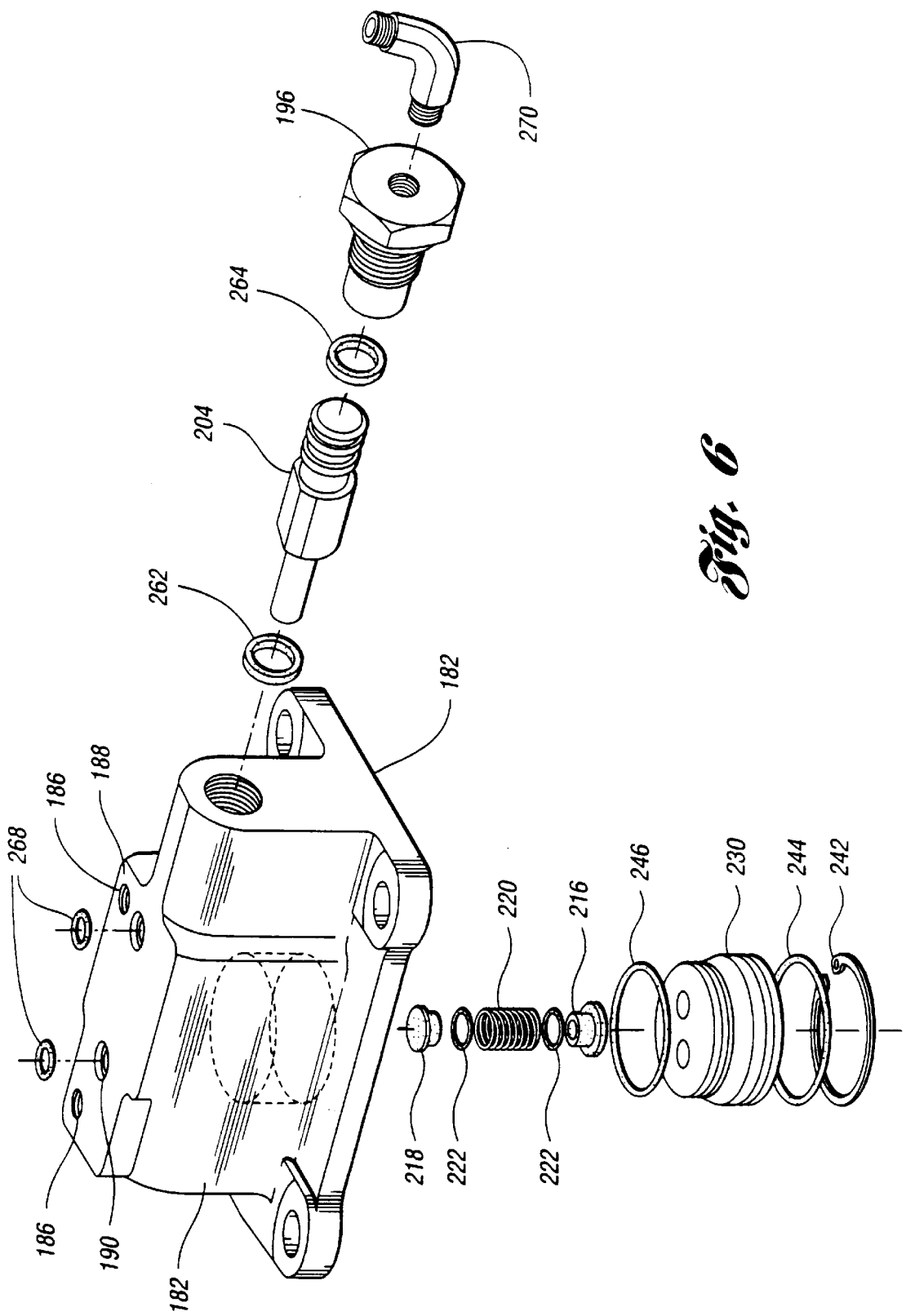
FIG. 6 is a three-dimensional assembly drawing of a range cylinder cover assembly according to the present invention.

Referring now to FIG. 6, a three-dimensional assembly drawing of the range cylinder cover assembly 180 illustrated in FIGS. 4 and 5 is shown. O-rings 268 are used to seal the supply bore 190 and dead-headed bore 192 between housing 182 and the direct-mounted filter/regulator (not shown).

Figure 7:
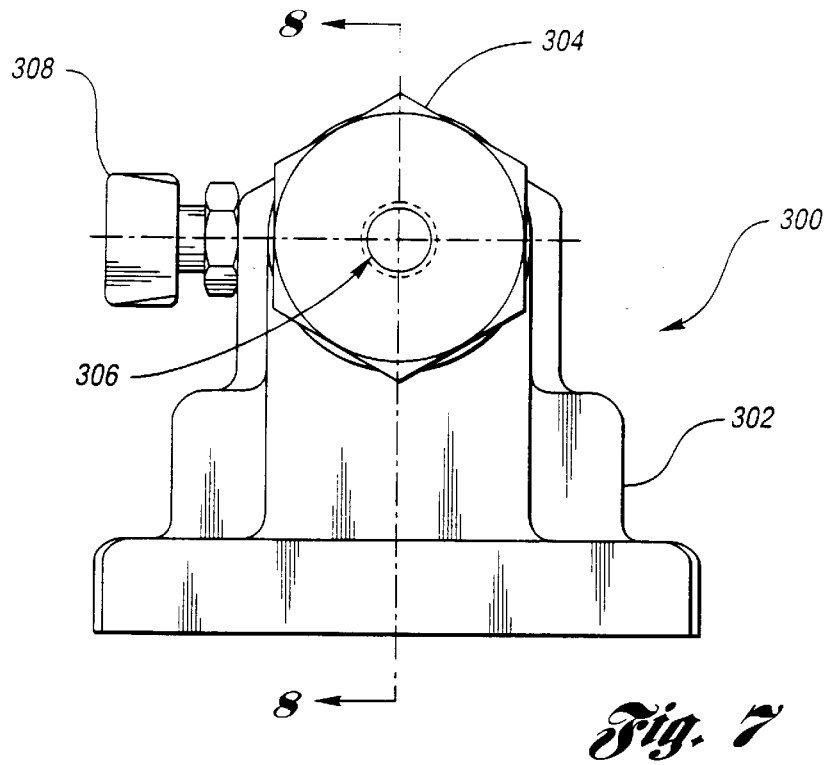
FIG. 7 is a side view of a splitter cylinder cover assembly with a normally opened pilot cap according to the present invention.

Referring now to FIG. 7, a side view of a splitter cylinder cover assembly for use in controlling a splitter shift according to the present invention is shown. Splitter cylinder cover assembly 300 includes a housing 302. Pilot cap 304 is threadingly engaged with housing 302. Pilot cap 304 includes a hex head for ease in assembly and disassembly. A center bore 306 includes standard pipe threads to accommodate an appropriate fitting and hose to provide a pressurized fluid control signal, preferably air. An exhaust breather 308 is threadingly engaged to an exhaust bore.

Figure 8:
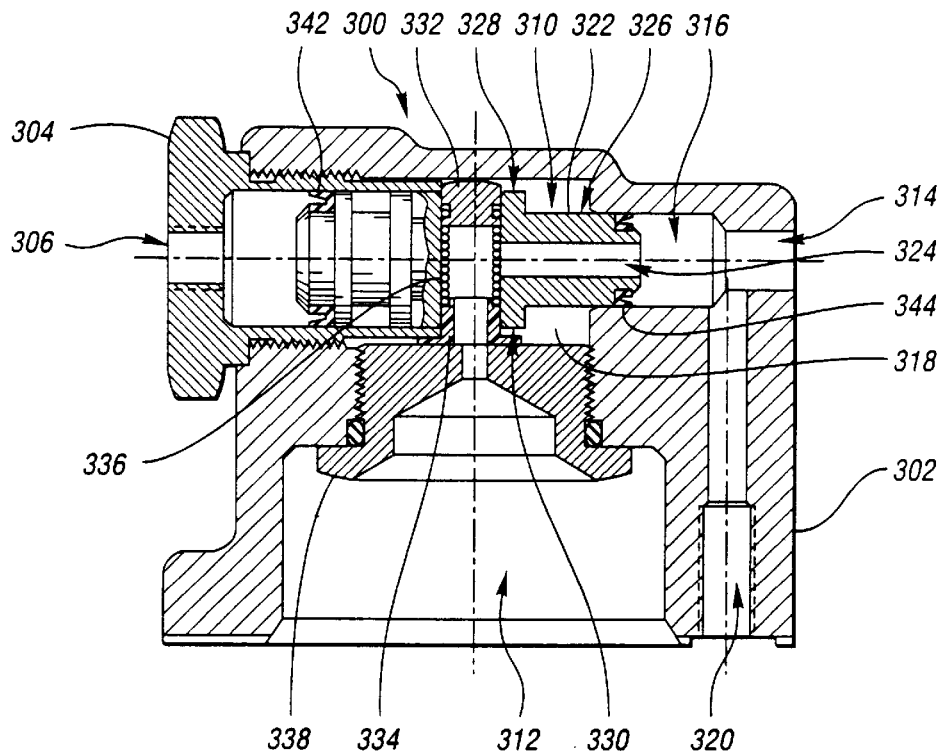
FIG. 8 is a cross-section taken along line 8—8 of FIG. 7.

Referring now to FIG. 8, a cross-section taken along line 8—8 of FIG. 7 is shown. Housing 302 includes a valve bore, indicated generally by reference numeral 310, a seal plate bore, indicated generally by reference numeral 312, and a supply bore, indicated generally by reference numeral 314. As illustrated, valve bore 310 extends through housing 302 in a first direction while seal plate bore 312 is generally transverse to, and intersects valve bore 310. Supply bore 314 intersects a first portion 316 of valve bore 310. An exhaust bore (not specifically illustrated) intersects a second portion 318 of valve bore 310. A supply channel 320 extends from first portion 316 of valve bore 310 and/or supply bore 314 generally parallel to seal plate bore 312 to supply pressurized fluid to a distal side of the splitter piston (now shown).

A spool 322 is disposed within valve bore 310 for selectively directing the pressurized supply fluid from supply bore 314 to either the supply channel 320 or the seal plate bore 312 based on whether the high-split or low-split has been commanded. Spool 322 includes an axial bore 324 extending from a first portion 326 having a first diameter, to a second portion 328 having a second diameter with a flatted portion 330. Second portion 328 of spool 322 includes a transverse bore for receiving a first sealing member (also referred to as a balance seal) 332 positioned in the transverse bore and partially extending therefrom to engage valve bore 310. A second sealing member (also referred to as a slipper seal) 334 is positioned diametrically opposite first sealing member 332 and extends partially within the transverse bore through spool 322. A spring 336 disposed within the transverse bore of spool 322 exerts a force directed radially outward relative to center of spool 322 such that first sealing member 332 and second sealing member 334 contact valve bore 310 and a third sealing member (also referred to as a seal plate) 338, respectively. Spring 336 assists in centering and sealing spool 322 within valve bore 310.

As also shown in FIG. 8, a third sealing member or seal plate 338 is generally cylindrically shaped with a flange to provide a positive stop for seal plate 338 which is positioned between valve bore 310 and seal plate bore 312. Seal plate 338 cooperates with the flange of second sealing member 334 to selectively provide pressurized supply fluid to a proximate side of the splitter piston (not shown). Preferably, seal plate 338 includes threads for engagement with housing 302 with an appropriate seal 340, such as an O-ring.

Pilot cap 304 is generally cylindrically shaped with a flange and positioned such that the cylindrical portion extends within valve bore 310 and cooperates with spool 322 to limit travel of spool 322 in one direction. Pilot cap 304 includes a through bore 306 for selectively supplying a pressurized fluid control signal to shift spool 322 to the high-split position. Spool 322 includes a large U-shaped (in cross-section) cup seal 342 which cooperates with the inside diameter of pilot cap 304. A small, U-shaped cup seal 344 cooperates with first portion 316 of valve bore 310 to guide spool 322 while also sealing and separating first portion 316 from second portion 318.

In operation, regulated and filtered supply air enters housing 302 through supply bore 314 and is preferably about 60 psig. When spool 322 is in the position shown, the supply air urges spool 322 toward the left such that the through bore is aligned with the bore through seal plate 338. Pressurized supplied fluid is directed through seal plate 338 and supply channel 320 to provide pressurized fluid to both sides of the splitter piston (not shown). Because the splitter piston has a differential area, a substantially equal pressure on both sides will result in an unequal force such that the piston translates within the splitter cylinder in a first direction. When the vehicle operator commands a splitter shift, pressurized pilot air, preferably at 60 psig, is supplied through bore 306. The differential areas of spool 322 cause spool 322 to travel toward the right with substantially equal pressure on both sides. This results in supply air coming from supply bore 314 and traveling through bore 324 and spool 322 to be blocked by seal plate 338. At the same time, the bore through seal plate 338 connects the seal plate bore 312 to exhaust. As such, pressurized air is supplied to the distal side of the splitter piston through supply channel 320 while the proximate side of the splitter piston is exhausted. This allows the splitter piston to travel up into housing 302 to effect the splitter shift.

Referring now to FIG. 9, an alternative embodiment of a splitter cylinder cover assembly according to the present invention is shown. Those components having similar structure and function as components illustrated and described with reference to FIG. 8 are not described in detail here. The embodiment illustrated in FIG. 9 includes a normally closed pilot cap 350 which extends within valve bore 352 a distance less than the normally open pilot cap 304 (FIG. 8). As such, in the absence of a pilot signal through pilot bore 354, spool assembly 356 is biased toward the left by pressurized supply air entering through supply bore 358. In this position, supply air travels through spool assembly 356 and the transverse bore, but is blocked by seal plate 360. Bore 362 through seal plate 360 couples seal plate bore 364 to exhaust. When pilot air is supplied, spool assembly 356 translates toward the right aligning the transverse bore of the slipper seal with bore 362.

As also illustrated in FIG. 9, seal plate 360 includes an orifice 366 having a size which limits the fill rate of the proximate end of the splitter piston (not shown) to control duration of the splitter shift. This may be desirable in applications having large ratio steps. Likewise, a plug 368 disposed within the supply channel 370 includes an orifice sized to limit a fill rate of the distal end of the splitter piston to control duration of the splitter shift. It should be noted that the normally closed configuration may be utilized with or without the fill-rate limiting orifices depending upon the particular application. Likewise, the normally open configuration illustrated in FIG. 8 may be used with appropriate orifice sizes to limit the fill rate of the cylinder to control duration of the shift.

Referring now to FIG. 10, a three-dimensional assembly drawing illustrating a splitter cylinder cover assembly according to the present invention is shown. FIG. 10 is generally applicable to the assemblies illustrated in FIGS. 8 and 9 as well as the various combinations of normally open, normally closed, limited-rate, and non-orificed configurations.

While the best mode contemplated for practicing the invention has been described in detail, it is understood that various modifications are possible without departing from the spirit and scope of the invention as defined by the following claims.

What is claimed is:

1. A control system for controlling shifting of an auxiliary section of a compound mechanical transmission, the auxiliary section including a plurality of gears with an associated cylinder, piston, and shifting shaft coupled to a shift fork to selectively engage one of the plurality of gears to a rotating shaft to alter a ratio of auxiliary section input speed to output speed, the system comprising:

a cylinder cover adapted for engagement with the cylinder, the cylinder cover having a seal plate bore and a valve bore, the valve bore oriented generally transverse to the seal plate bore;

a spool valve disposed within the valve bore and axially translatable between a first position connecting a supply of pressurized fluid to a first side of the piston to translate the piston in a first direction within the cylinder to engage a first one of the plurality of gears, and a second position connecting the supply of pressurized fluid to a second side of the piston to translate the piston to a second direction within the cylinder to engage a second one of the plurality of gears, the spool valve having first, second, and third diameters, the first diameter being smaller than the second and third diameters to bias the spool valve toward the first direction when equal pressure is applied to the first and third diameters, the first diameter having an axial bore extending therethrough and intersecting a transverse bore extending through the second diameter and exiting the spool valve in a flatted region;

a first sealing member having an annular portion extending within the transverse bore of the second diameter of the spool valve with a flange contacting the flatted portion;

a second sealing member diametrically opposed the first sealing member, the second sealing member partially disposed within the transverse bore and extending radially outward to contact the valve bore; and a spring disposed between the first and second sealing members, the spring urging the first and second sealing members radially outward to center the spool valve within the valve bore.

2. The system of claim 1 further comprising:

a seal plate disposed between the seal plate bore and the valve bore, the seal plate including a first channel for selectively fluidly coupling the valve bore to the first side of the piston and a second channel for selectively fluidly coupling the valve bore to the second side of the piston.

3. The system of claim 2 wherein the seal plate includes a flat portion which protrudes within the valve bore and contacts the flange of the first sealing member.

4. The system of claim 2 wherein the seal plate includes a slot for receiving a dowel to angularly orient the seal plate such that the first and second channels align with the first sealing member when the spool valve is in the first and second positions, respectively.

5. The system of claim 2 wherein the seal plate and cylinder cover include cooperating threads for securing the seal plate within the cylinder cover.

6. The system of claim 2 wherein the cylinder cover includes a groove and wherein the seal plate is secured within the cylinder cover by a snap ring which cooperates with the groove.

7. The system of claim 1 further comprising:

a cap having a distal end extending within the valve bore to provide a positive stop for the spool valve to define the first position.

8. The system of claim 1 further comprising:

a filter regulator mounted to the cylinder cover, the filter regulator regulating pressure and filtering the pressurized fluid while supplying the filtered and regulated pressurized fluid directly to the valve bore to eliminate hoses therebetween.

9. The system of claim 1 wherein the system controls a range shift to select either a high range or low range for the transmission.

10. The system of claim 1 wherein the system controls a splitter shift of the transmission.

11. The system of claim 1 wherein the spool valve and the cylinder cover are made of similar material to reduce galvanic corrosion which may result in sticking of the spool valve within the valve bore.

12. The system of claim 1 wherein the spool valve and cylinder cover are made of anodized aluminum.

13. The system of claim 1 wherein the cylinder cover includes an exhaust port which intersects the valve bore and wherein the first position of the valve spool fluidly couples the second side of the piston to the exhaust port.

14. The system of claim 1 wherein the cylinder cover includes an exhaust port which intersects the valve bore and wherein the second position of the spool valve spool fluidly couples the first side of the piston to the exhaust port.

15. A splitter cylinder cover assembly for use in controlling a splitter shift in an auxiliary section of a mechanical compound transmission having a splitter cylinder with a splitter piston connected to a splitter shaft which travel between a high-split position and a low-split position in response to a pressurized fluid control signal, the assembly comprising:

a housing having a valve bore, a seal plate bore, a supply bore, an exhaust bore, and a supply channel, the valve bore extending through the housing in a first direction, the seal plate bore being generally transverse to and intersecting the valve bore, the supply bore intersecting a first portion of the valve bore, the exhaust bore intersecting a second portion of the valve bore, and the supply channel extending from the valve bore generally parallel to the seal plate bore to supply pressurized fluid to a distal side of the splitter piston;

a spool disposed within the valve bore for selectively directing the pressurized supply fluid from the supply bore to one of the supply channel and the seal plate bore based on whether the high-split or low-split has been commanded, the spool including an axial bore extending from a first portion having a first diameter to a second portion having a second diameter with a flatted portion, and a transverse bore intersecting the axial bore;

a first sealing member positioned within the transverse bore of the spool and partially extending therefrom to engage the valve bore;

a second sealing member, cylindrically shaped with a flange, the second sealing member positioned within the transverse bore of the spool such that the flange contacts the flatted portion of the second diameter of the spool;

a spring disposed within the transverse bore of the spool between the first and second sealing members;

a third sealing member, cylindrically shaped with a flange, the third sealing member positioned between the valve bore and the seal plate bore and cooperating with the flange of the second sealing member to selectively provide the pressurized supply fluid to a proximate side of the splitter piston; and a cylindrically shaped cap with a flange, the cap extending within the valve bore and cooperating with the spool to limit travel of the spool in one direction, the cap having an orifice for supplying the pressurized fluid control signal to shift the spool to the high-split position.

16. The assembly of claim 15 further comprising:

a plug disposed within the supply channel to limit a fill rate of the distal end of the splitter piston to control duration of the splitter shift.

17. The assembly of claim 16 wherein the third sealing member includes an orifice having a size to limit a fill rate of the proximate end of the splitter piston to control duration of the splitter shift.

18. The assembly of claim 1 further comprising:

a plug disposed within the supply channel to limit a fill rate of the distal end of the piston to control duration of the shift.

19. A range cylinder cover assembly for use in controlling a range shift in an auxiliary section of a mechanical compound transmission having a range cylinder with a range piston connected to a range shaft which travel between a high-range position and a low-range position in response to a pressurized fluid control signal, the assembly comprising:

- a housing having a valve bore, a seal plate bore, a supply bore, an exhaust bore, and a supply channel, the valve bore extending through the housing in a first direction, the seal plate bore being generally transverse to and intersecting the valve bore, the supply bore intersecting a first portion of the valve bore, the exhaust bore intersecting a second portion of the valve bore, and the supply channel extending from the valve bore to a distal end of the cylinder to supply pressurized fluid to a distal side of the range piston;
- a pressure regulator mounted to the housing and supplying filtered, regulated supply fluid directly to the supply bore;
- a spool disposed within the valve bore for selectively directing the pressurized supply fluid from the supply bore to one of the supply channel and the seal plate bore based on whether the high-range or low-range has been commanded, the spool including an axial bore extending from a first portion having a first diameter to a second portion having a second diameter with a flatted portion, and a transverse bore intersecting the axial bore;
- a first sealing member positioned within the transverse bore of the spool and partially extending therefrom to engage the valve bore;
- a second sealing member, cylindrically shaped with a flange, the second sealing member positioned within the transverse bore of the spool such that the flange contacts the flatted portion of the second diameter of the spool;
- a spring disposed within the transverse bore of the spool between the first and second sealing members;
- a third sealing member, cylindrically shaped with a flange, the third sealing member positioned between the valve bore and the seal plate bore and cooperating with the flange of the second sealing member to selectively provide the pressurized supply fluid to a proximate side of the range piston; and
- a cylindrically shaped cap with a flange, the cap extending within the valve bore and cooperating with the spool to limit travel of the spool in one direction, the cap having an orifice for supplying the pressurized fluid control signal to shift the spool to the high-range position.

* * * * *